(12) United States Patent
Stirniman et al.

(10) Patent No.: US 6,355,300 B1
(45) Date of Patent: Mar. 12, 2002

(54) DISC LUBRICATION FOR THE LOAD/UNLOAD HEAD DISC INTERFACE

(75) Inventors: Michael Joseph Stirniman; Samuel John Falcone, both of San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/454,752

(22) Filed: Dec. 6, 1999

Related U.S. Application Data

(60) Provisional application No. 60/111,221, filed on Dec. 7, 1998.

(51) Int. Cl.[7] .............................. B05D 5/00; B05D 5/08
(52) U.S. Cl. .............. 427/127; 427/255.23; 427/255.5; 427/422; 427/425; 428/65.4; 428/65.8
(58) Field of Search .................. 427/255.23, 255.5, 427/255.6, 256, 131, 402, 127, 421, 422, 424, 425; 428/65.3, 65.4, 65.8; 360/135; 239/1, 8–10, 398

(56) References Cited

U.S. PATENT DOCUMENTS

| | | | | |
|---|---|---|---|---|
| 4,868,009 A | * | 9/1989 | Stefanini | 427/127 |
| 4,882,197 A | | 11/1989 | Matsudaira et al. | |
| 4,920,919 A | | 5/1990 | Matsudaira et al. | |
| 4,960,324 A | * | 10/1990 | Brown | 350/357 |
| 5,030,480 A | * | 7/1991 | Roze et al. | 427/129 |
| 5,650,900 A | * | 7/1997 | Wei et al. | 360/135 |
| 5,674,582 A | * | 10/1997 | Eltoukhy et al. | 428/65.4 |
| 5,820,945 A | | 10/1998 | Wei et al. | |
| 5,874,169 A | | 2/1999 | Falcone | |
| 6,096,385 A | * | 8/2000 | Yong et al. | 427/510 |
| 6,099,896 A | * | 8/2000 | Stirniman | 427/131 |
| 6,118,632 A | * | 9/2000 | Albrecht et al. | 360/135 |
| 6,168,831 B1 | * | 1/2001 | Khan et al. | 427/240 |
| 6,183,831 B1 | * | 2/2001 | Hughes et al. | 428/65.3 |

FOREIGN PATENT DOCUMENTS

| | | | | |
|---|---|---|---|---|
| JP | | 59175030 A | * | 10/1984 |
| JP | | 06203374 A | * | 7/1994 |

* cited by examiner

Primary Examiner—Shrive P. Beck
Assistant Examiner—Wesley Markham
(74) Attorney, Agent, or Firm—Merchant & Gould P.C.

(57) ABSTRACT

A method for lubricating a thin film magnetic media is disclosed wherein the magnetic media is lubricated only at the head-disc interface zone. The method comprises the steps of vaporizing the lubricant, mixing the lubricant with a carrier gas stream, and depositing a film of the lubricant on at the loading zone on the surface of the magnetic media. The lubricant film can be selectively deposited on the surface of the magnetic disc at any location and at any thickness. In one embodiment of the invention, the lubricant film forms a radial band on the surface of the magnetic disc located near the outside diameter of the magnetic disc.

13 Claims, 4 Drawing Sheets

DISC LUBRICATION FOR THE LOAD/UNLOAD HEAD DISC INTERFACE

RELATED APPLICATIONS

This application claims priority from Provisional Patent Application 60/111,221 filed Dec. 7, 1998.

FIELD OF THE INVENTION

This invention relates generally to disc drive assemblies comprising thin film magnetic media, and more particularly, to a method for lubricating a thin film magnetic media at the head-disc interface zone.

BACKGROUND OF THE INVENTION

Thin film magnetic media are usually prepared with a protective overcoat having a thin layer of carbon. The carbon overcoat serves to protect the underlying soft magnetic alloys against excessive frictional wear caused by the sliding action of the read-write head on the magnetic disc media. To improve the frictional properties of the head/disc interface, the carbon overcoat is typically covered with a thin topcoat of lubricant. The thin topcoat of lubricant generally has a thickness between 1 and 4 nanometers.

The lubricant topcoat may be applied using a dip coating technique. In the dip coating technique, the lubricant is dissolved in a solvent at low concentration and the magnetic disc media is dipped into the solution and withdrawn. Alternatively, the lubricant solution can be pumped over the magnetic media and then drained away. As the magnetic disc media is lifted or the lubricant solution drained, a meniscus of solution is dragged along the disc's surface. Accordingly, as the solvent evaporates, a thin film of the nonvolatile lubricant is left on the disc. The amount of lubricant in the film can be controlled either by varying the concentration of lubricant in the solution, the rate at which the media is lifted or the solution drained, or a combination of either method.

Moreover, the magnetic disc media and flying read-write head of conventional disc drives are typically extremely smooth in order to support the low fly heights required in modern disc drives. Typically, the flying read-write head lands on the surface of the disc when the drive is powered down and the disc stops spinning. However, the use of smooth magnetic disc media and read-write heads in combination with a thin layer of lubricant results in a high contact area interface and excessive static frictional forces when the drive restarts.

In some cases, the static frictional forces will exceed the capacity of the drive motor thereby resulting in a functional failure of the drive. Some disc drive mechanisms have resolved this problem by employing a dynamic load-unload mechanism. The dynamic load-unload mechanism places the flying read-write head onto the surface of the disc while it is already spinning. Similarly, the read-write head is removed from the disc before it stops spinning and, therefore, never rests on the stationary disc surface. Thus, the possibility of excessive static friction does not exist.

Despite these benefits of the dynamic load-unload mechanism, it has several shortcomings. Because the air bearing that supports the flying read-write head is not immediately established during the load process, the read-write head and the disc may experience high speed intermittent contact. This contact can damage the surface of the thin film magnetic media and result in data loss. Furthermore, the contact may also result in the head crashing into the disc surface causing a catastrophic failure of the disc drive.

Moreover, there are several drawbacks relating to the dip coating technique used to lubricate the thin film magnetic disc. For example, when applying the lubricant to the surface of the disc, the bath typically contains only a small amount of the lubricant dissolved in a solvent. This process typically results in the consumption of large quantities of solvent. Consequently, this results in increased cost and concern with environmental hazards associated with the presence of solvent vapors in the workplace.

Another drawback related to the dip lubrication method is the non-selectivity in applying the lubrication to the surface of the disc. Typically, the dip lubrication method results in the lubricant being applied to the entire surface of the disc. However, in some instances, with zone-textured media having a specific radial band designated for the load-unload region of the read-write head, the lubricant film present on the other portions of the disc surface is unnecessary and wasteful.

For example, many mechanisms load and unload the read-write head at the outside edge of the disc using some sort of ramp. The excessive lubricant on the rest of the disc's surface (e.g., the data region) may be picked up by the read-write head and alter its flying characteristics. Consequently, the presence of the lubricant film on entire disc surface is detrimental to the performance of the disc drive mechanism.

Accordingly, there exists a need for technology enabling the application of a lubricant film free of the aforementioned drawbacks of conventional dipping.

SUMMARY OF THE INVENTION

Generally, the invention relates to a method for lubricating a thin film magnetic media at the head-disc interface zone. The method comprises the steps of vaporizing the lubricant, mixing the lubricant with a carrier gas stream, and depositing a film of the lubricant at the head-disc interface zone on the surface of the magnetic media.

In one embodiment of the invention, the lubricant is vaporized using a solvent-free lubricant deposition process. Typically, the use of a solvent-free lubricant deposition process reduces the costs associated with the use of specialty solvents and their potential environmental impact. An exemplary solvent-free lubricant deposition process is discussed in currently pending patent application entitled "Method and Apparatus for Zone Lubrication of Magnetic Media" naming Michael J. Stirniman as inventor and assigned Ser. No. 09/101,793, now U.S. Pat. No. 6,099,896, the disclosure of which is herein incorporated by reference. One embodiment of this solvent-free lubrication apparatus employs a carrier gas driven vapor deposition for zone lubrication of magnetic media.

In another embodiment of the invention, the magnetic disc media has a data zone and a loading zone defined as annular cross-sections on the surface of the magnetic disc media. Furthermore, the method of lubricating the surface of the magnetic disc media involves depositing the film of the lubricant on the loading zone.

In yet another embodiment of the invention, the loading zone has an outside diameter substantially equal to the outside diameter of the magnetic disc media. Accordingly, when the lubricant in deposited onto the loading zone, the lubricant is only applied to an annular cross-section of the surface of the magnetic disc media that is located near the outer edge of the magnetic media.

In another embodiment, the invention relates to a method of applying a radial band of lubricant film to the surface of a magnetic disc media. The radial band of lubricant film is located near the outside diameter of the magnetic disc. The method comprises the steps of vaporizing the lubricant, mixing the lubricant with a carrier gas stream, and depositing a film of the lubricant on at the loading zone on the surface of the magnetic media.

BRIEF DESCRIPTION OF THE FIGURES

The invention may be more completely understood in consideration of the detailed description of various embodiments of the invention that follows in connection with the accompanying drawings, in which.

Figure 1:
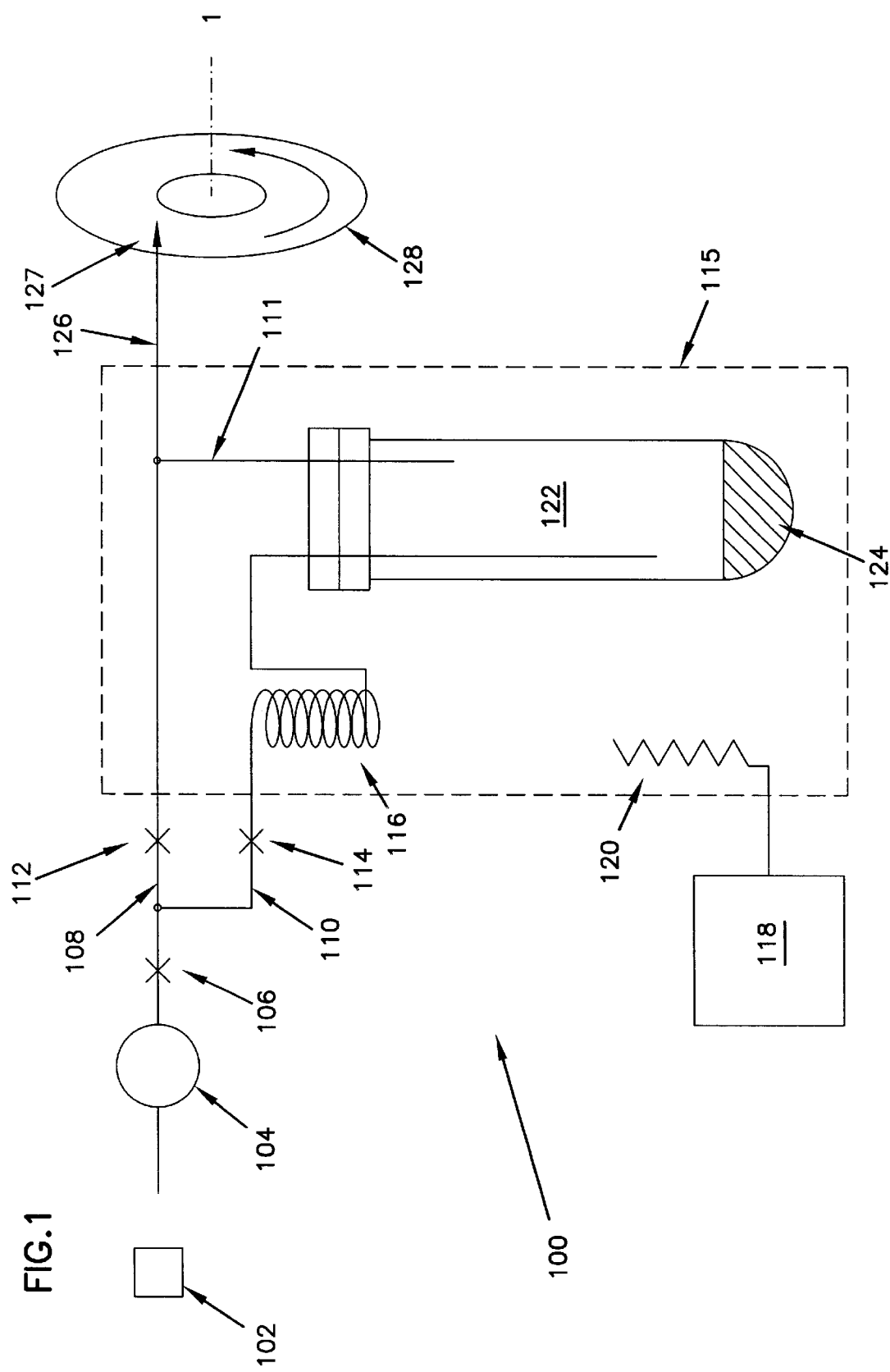
FIG. 1 is a process flow diagram showing a typical process for applying a lubrication film to a magnetic media according to the method of the invention.

While the invention is amenable to various modifications and alternative forms, specifics thereof have been shown by way of the drawings and will be described in detail. It should be understood, however, that the intention is not to limit the invention to the particular embodiments described. On the contrary, the invention is to cover all modifications, equivalents, and alternatives falling within the spirit and scope of the invention as defined by the appended claims.

DETAILED DESCRIPTION OF PREFERRED EMBODIMENTS

Generally, the invention relates to a method for lubricating a thin film magnetic media at the head-disc interface zone. The method comprises the steps of vaporizing the lubricant, mixing the lubricant with a carrier gas stream, and depositing a film of the lubricant at the loading zone on the surface of the magnetic media. In another embodiment of the invention, the lubricant film forms a radial band on the surface of the magnetic disc.

Lubricants conventionally employed in manufacturing magnetic recording media typically comprise mixtures of long chain polymers characterized by a wide distribution of molecular weights and include perfluoropolyethers, functionalized perfluoropolyethers, perfluoropolyalkylethers, and functionalized perfluoropolyalkylethers. The molecular weight of a lubricant affects the mechanical performance of the interface and, as a consequence, optimal ranges of molecular weight distribution are typically determined for a particular lubricant. Lubricants of such specific, optimal molecular weight distribution are prepared by fractionating the lubricant mixtures prior to adding the lubricant to the solvent bath, such conventional methodology being termed "pre-fractionation". The invention departs from such conventional "pre-fractionation" methodology by simplifying or eliminating pre-fractionation and the requirement for a solvent. In addition, embodiments of the invention enable selective coating of a particular area (i.e., localized zone) rather than indiscriminate application of a lubricant coating, thereby reducing lubricant consumption and improving product characteristics.

After investigation and experimentation, it was found, that since the molecular weight distribution of the commonly employed polymeric lubricants in the vapor phase is generally narrower and of lighter mean molecular weight than the associated equilibrium liquid phase, the vaporized rather than liquid lubricant can advantageously be employed in the manufacture of magnetic recording media such as magnetic discs. For example, considering Zdol 2000™, a perfluoropolyether lubricant available from Ausimont™, the molecular weight distribution in the vapor phase is significantly narrower than that of the liquid phase and is centered around a peak corresponding to a substantially lower molecular weight. Moreover, the effect is also obtainable even with pre-fractionated lubricant. It was found that use of lubricant vapor rather than lubricant liquid by vaporizing lubricant liquid results in an in-situ and on demand lubricant fractionation method, thereby obviating the need for a separate pre-fractionation process. Alternatively, a pre-fractionated lubricant can be employed with a somewhat different vapor phase molecular weight distribution.

In addition to use with polymeric lubricant materials as hereinabove described, the invention enjoys utility with a variety of other types of lubricant materials, including, but not limited to, monomeric oils and high vapor pressure solids as well as those lubricants disclosed in U.S. Pat. No. 5,874,169 entitled "Polymeric Perfluoro Polyether Phosphate Lubricant Topcoat," naming Samuel J. Falcone as inventor, the entire disclosure of which is herein incorporated by reference.

FIG. 1 is a diagram showing an apparatus for applying a lubricant film to a magnetic media using a solvent-free deposition process 100. A carrier gas 102 enters the apparatus and is passed through a low pressure regulator 104 and a shutoff/flow control valve 106. In one possible embodiment of the invention, carrier gas 102 is dry nitrogen. After passing through shutoff/flow control valve 106, carrier gas 102 is split into either bypass flow line 108 or lubricant flow line 110. Both bypass flow line 108 and lubricant flow line 110 may be equipped with shutoff valves 112 and 114, respectively, to control the flow of carrier gas 102 through the system.

Bypass flow line 108 and lubricant flow line 110 enter oven 115 which elevates the temperature of carrier gas 102. In one possible embodiment, oven 115 comprises a preheating coil 116, a sealed lube vial 122 that holds liquid lubricant 124, and a heater 120. Heater 120 is electrically coupled to a power source 118. The temperature generated by heater 120 can be controlled using a feedback circuit (not shown) capable of measuring the temperature of lubricant 124 and returning a signal back to control power source 118. For example, the temperature generated by heater 120 can be controlled using a thermocouple immersed in liquid lubricant 124.

The temperature in sealed lube vial 122 is elevated to a point such that liquid lubricant 124 is vaporized. Carrier gas 102 is place inside of sealed lube vial 122 through lubricant flow line 110. The vaporized lubricant mixes with carrier gas 102 and exits sealed lube vial 122 though vial exit flow line 111.

Bypass flow line 108 and vial exit flow line 111 merge into exit flow line 126 that extends beyond oven 115. Exit flow line 126 is connected to a deposition nozzle 127. Deposition nozzle 127 is positioned in close proximity to the surface of a rotating magnetic film disc 128. After exiting deposition nozzle 127, the lubricant mixture is directed towards and condensed on the surface of magnetic film disc 128 at room temperature. In one possible embodiment, deposition nozzle is manufactured from stainless steel and has an outside diameter of ¼ inch.

Additionally, deposition nozzle 127 and exit flow line 126 extending beyond oven 115 are heated separately. For example, deposition nozzle 127 and exit flow line 126 extending beyond oven 115 can be maintained at a temperature substantially equal to the temperature of lubricant 124 in sealed lubricant vial 122. Alternatively, deposition nozzle 127 and exit flow line 126 extending beyond oven 115 can be heated to a temperature about 10 degrees C above the temperature of lubricant 124 in sealed lubricant vial 122. Thus, the lubricant mixture is prevented from condensing inside of nozzle 127 and exit flow line 126 prior to deposition on the surface of magnetic film disc 128.

Figure 2A:
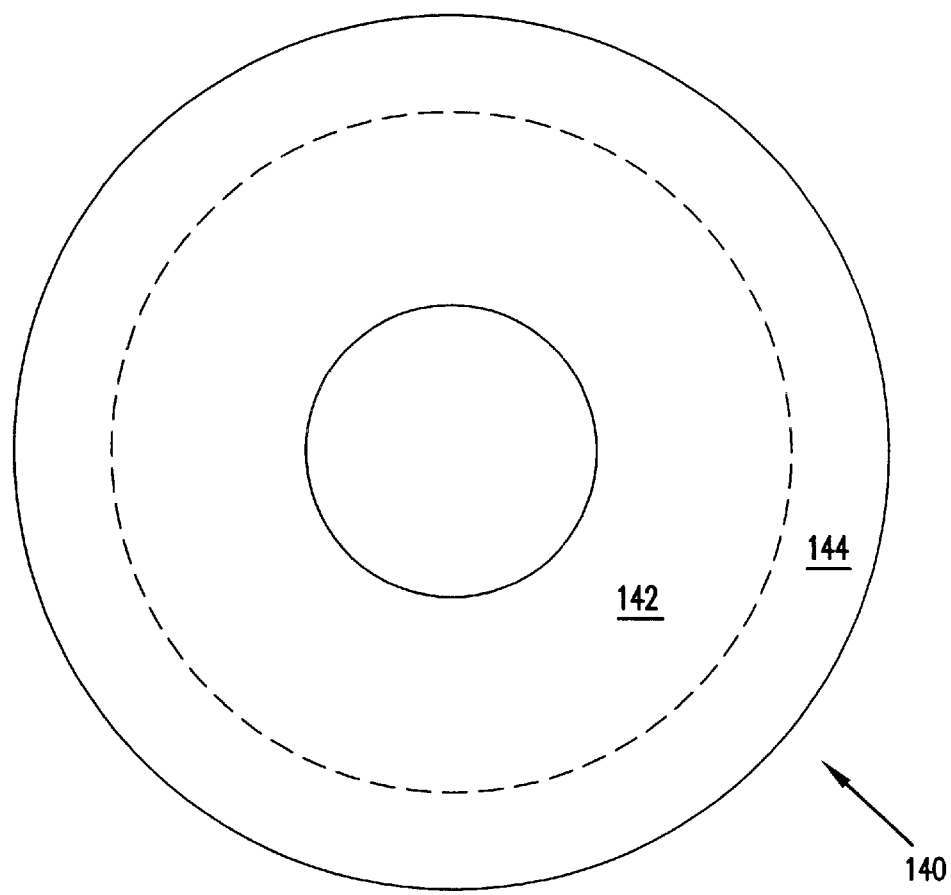
FIG. 2A is a side view of the surface of a magnetic disc.

FIG. 2A shows a side view of the surface of a magnetic disc. In one embodiment of the invention, magnetic film disc 140 has a data zone 142 and a loading zone 144. Data zone 142 defines an annular cross-section on the surface of magnetic film disc 140 and is the region of the disc where magnetically readable data is stored. Loading zone 144 also defines an annular cross-section on the surface of magnetic film disc 140. However, loading zone 144 is the interface zone between the surface of magnetic disc 140 and the read-write head (not shown). Both data zone 142 and loading zone 144 are concentric with magnetic disc 140. The dynamic load-unload mechanism places the read-write head onto loading zone 144 while magnetic disc 140 is already spinning. Similarly, the dynamic load-unload mechanism removes the read-write head from loading zone 144 before magnetic disc 140 stops spinning.

In one embodiment of the invention, loading zone 144 is preferably located near the outside diameter of magnetic disc 140. However, it should be understood that loading zone 144 can be located an any position on the surface of magnetic disc 140 according to the method of the invention. Furthermore, the width of the annular cross-section defining loading zone 144 can be between 1 and 10 millimeters and is preferably 5 millimeters.

Figure 2B:
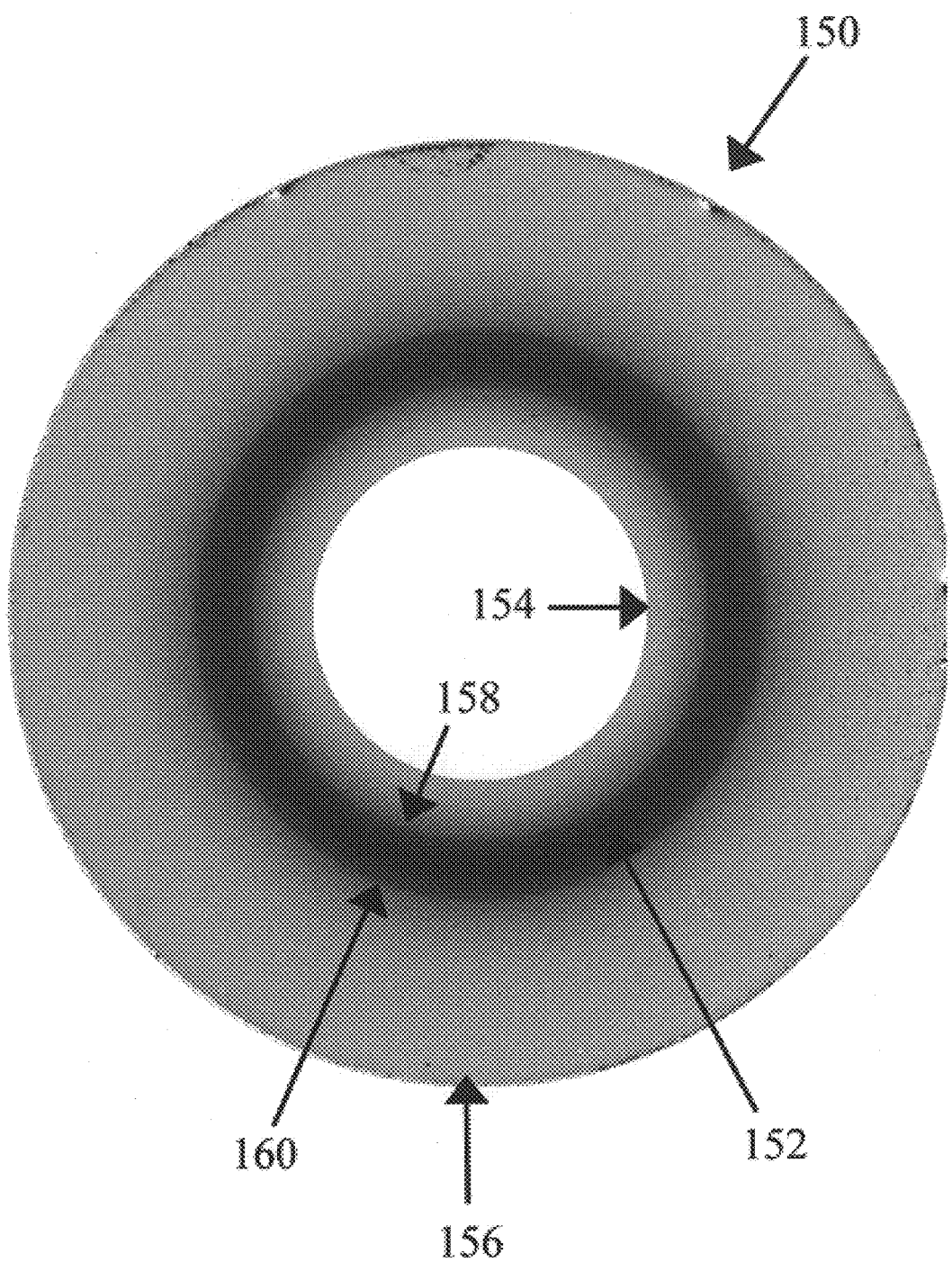
FIG. 2B is an optical reflectivity scan of the surface of a magnetic disc lubricated according to a method of the invention.

FIG. 2B shows an optical reflectivity scan of a magnetic disc surface lubricated according to the method of the invention. Magnetic film disc 150 was lubricated using a piece of ¼ inch outside diameter stainless steel tubing for a nozzle. The shading gradients as shown in FIG. 2B represent the relative thickness of the lubricant on the surface of magnetic film disc 150. For example, the darkest contours correspond to the thickest lubricant. On the other hand, the lighter contours correspond to the thinnest lubricant film on the surface of magnetic film disc 150. In one embodiment, the thickness of the lubricant on the surface of magnetic film disc 150 is less than 50 Ångstroms.

Magnetic film disc 150 has an inside diameter 154 and an outside diameter 156. As a result of lubricating magnetic film disc 150 according to the method of the invention, a radial band 152 of lubricant is formed on magnetic disc 150. Radial band 152 forms an annular cross-section on the surface of magnetic disc 150 and has an inside diameter 158 and an outside diameter 160. Moreover, radial band 152 has a radial thickness substantially equal to the outside diameter of nozzle 127. In one embodiment, radial band 152 has a radial thickness of approximately 1 to 10 millimeters, preferably 5 millimeters. However, the radial thickness of radial band 152 can be varied according to the size of the exit orifice of nozzle 127.

Similarly, as shown in FIG. 2B, radial band 152 can be deposited at any location on magnetic disc 150. For example, the outside diameter 160 of radial band 152 can be less than the outside diameter 156 of magnetic disc 150. Alternatively, the outside diameter 160 of radial band 152 can be equal to the outside diameter 156 of magnetic disc 150.

Figure 3:
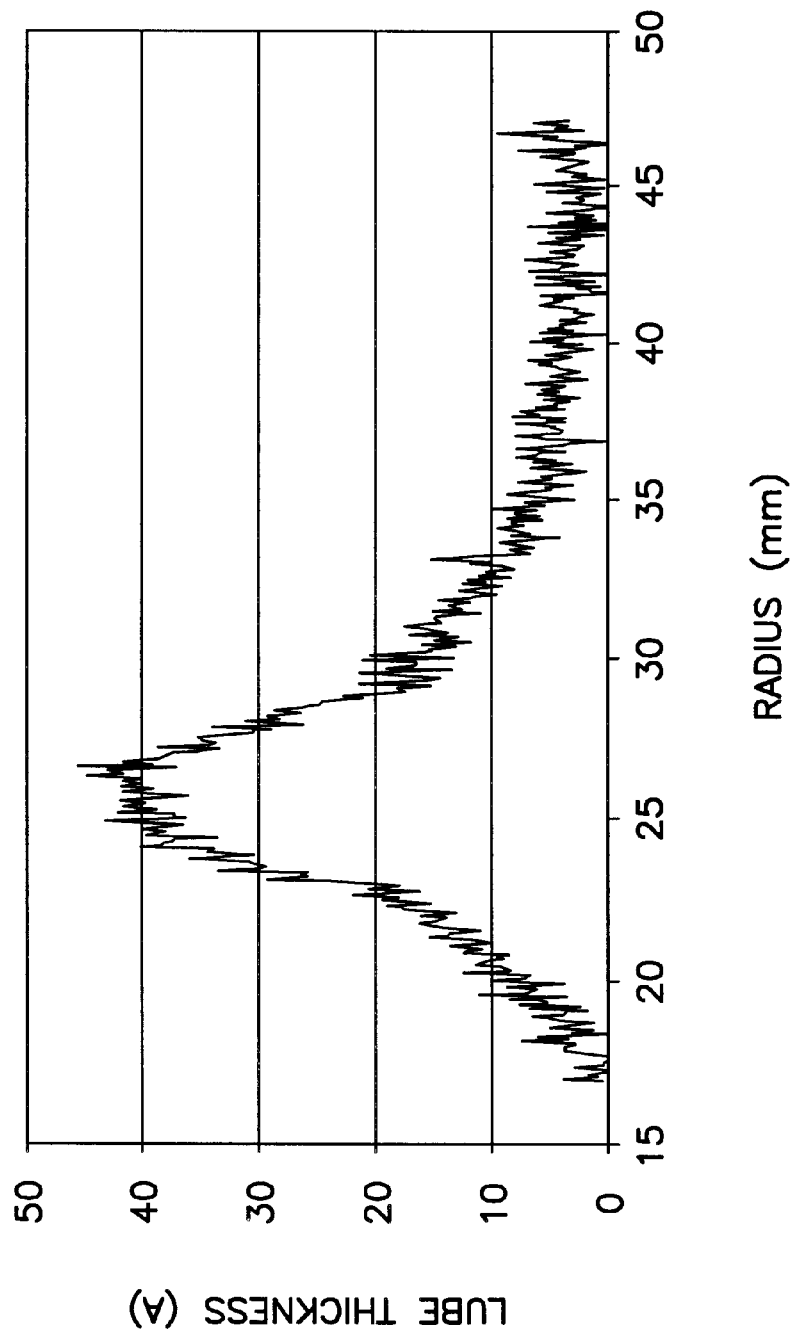
FIG. 3 is a radial scan of a magnetic disc surface that has been lubricated according to method of the invention.

FIG. 3 is a graph depicting a radial scan from near the inner diameter to the outer diameter of magnetic disc 150. The radial scan was made using the optical reflectivity scan of magnetic disc 150 discussed in relation to FIG. 2. The optical reflectivity is converted to lubricant thickness assuming a linear relationship. Moreover, the lubricant thickness was calibrated using Fourier transform infrared spectroscopy.

As shown in FIG. 3, the shading gradients as shown in FIG. 2 represent and correspond to the relative thickness of the lubricant film on the surface of magnetic disc 150. Furthermore, the lubricant film has a thickness of less than 50 Ångstroms or 5 nanometers. Similarly, the width of the radial band of lubricant film is approximately 5 millimeters. Accordingly, the lubricant film can be applied to the surface of magnetic disc 150 at a localized area without unnecessarily lubricating the entire surface of magnetic disc 150.

The above specification, examples and data provide a complete description of the manufacture and use of the composition of the invention. Since many embodiments of the invention can be made without departing from the spirit and scope of the invention, the invention resides in the claims hereinafter appended.

The claimed invention is:

1. A method of lubricating a surface of a thin film magnetic disc for use with a dynamic load-unload mechanism having a head for reading data from the surface of the magnetic disc, wherein the magnetic disc has a data zone and a loading zone, the method comprising the steps of:
   vaporizing the lubricant;
   mixing the lubricant with a carrier gas stream;
   mixing the lubricant and the carrier gas stream with a bypass gas stream; and
   depositing a film of the lubricant on the loading zone of the surface of the magnetic disc.

2. The method of claim 1, wherein the lubricant is vaporized using a solvent-free lubrication deposition process.

3. The method of claim 1, wherein the carrier gas stream and the bypass gas stream are dry nitrogen.

4. The method of claim 1, wherein the loading zone of the magnetic disc defines an annular cross-section on the surface of the magnetic disc.

5. The method of claim 4, wherein the width of the annular cross-section is between 1 and 10 millimeters.

6. The method of claim 5, wherein the width of the annular cross-section is 5 millimeters.

7. The method of claim 4, wherein the outside diameter of the magnetic disc is substantially equal to the outside diameter of the annular cross-section of the loading zone.

8. The method of claim 1, wherein the lubricant film has a thickness less than 50 Ångstroms.

9. A method of applying a radial band of lubricant film to the surface of a magnetic disc, wherein the radial band of lubricant film is located near the outside diameter of the magnetic disc, the method comprising:
   vaporizing the lubricant;
   mixing the lubricant with a carrier gas stream;
   mixing the lubricant and the carrier gas stream with a bypass gas stream; and
   depositing the lubricant film to the surface of the magnetic disc.

10. The method of claim 9, wherein the radial band of lubricant film forms an annular cross-section on the surface of the magnetic disc, wherein the width of the annular cross-section is between 1 and 10 millimeters.

11. The method of claim 10, wherein the width of the annular cross-section is 5 millimeters.

12. The method of claim 9, wherein the lubricant film has a thickness of less than 50 Ångstroms.

13. The method of claim 9, wherein the carrier gas stream and the bypass gas stream are dry nitrogen.

* * * * *